(12) United States Patent
Freemantle et al.

(10) Patent No.: US 10,753,435 B2
(45) Date of Patent: Aug. 25, 2020

(54) WEIGHT AND COST OPTIMIZED CARRIER FOR MODULAR HYDRAULIC TENSIONER

(71) Applicant: BorgWarner Inc., Auburn Hills, MI (US)

(72) Inventors: Paul Freemantle, Lansing, NY (US); Joseph P. Goodsell, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 300 days.

(21) Appl. No.: 15/540,039

(22) PCT Filed: Dec. 14, 2015

(86) PCT No.: PCT/US2015/065515
§ 371 (c)(1),
(2) Date: Jun. 27, 2017

(87) PCT Pub. No.: WO2016/109171
PCT Pub. Date: Jul. 7, 2016

(65) Prior Publication Data
US 2017/0363181 A1   Dec. 21, 2017

Related U.S. Application Data

(60) Provisional application No. 62/097,168, filed on Dec. 29, 2014.

(51) Int. Cl.
*F16H 7/08* (2006.01)

(52) U.S. Cl.
CPC ... *F16H 7/0848* (2013.01); *F16H 2007/0806* (2013.01); *F16H 2007/0812* (2013.01);
(Continued)

(58) Field of Classification Search
CPC ........... F16H 7/0848; F16H 2007/0859; F16H 2007/0812; F16H 2007/0872;
(Continued)

(56) References Cited

U.S. PATENT DOCUMENTS 5,993,342 A * 11/1999 Wigsten .................... F16H 7/08
474/110
6,193,623 B1   2/2001 Koch et al.
(Continued)

FOREIGN PATENT DOCUMENTS

CN   1782464 A   6/2006
CN   1928392 A   3/2007
(Continued)

OTHER PUBLICATIONS

International Search Report for Application No. PCT/US2015/065515 dated Feb. 25, 2016, 3 pages.
(Continued)

*Primary Examiner* — Michael R Mansen
*Assistant Examiner* — Juan J Campos, Jr.
(74) *Attorney, Agent, or Firm* — Howard & Howard Attorneys PLLC

(57) ABSTRACT

A hydraulic tensioner (10) and method of manufacture can include a housing (12), a piston (16) moveable from a retracted position toward an extended position with respect to the housing (12) in response to fluid pressure, and a tensioner spring (36) biasing the piston (16) toward the extended position. The hydraulic tensioner (10) can include a modular sleeve (14) supported by the housing (12) and defining an aperture (15) for slidably receiving the piston (16) and defining an expandable fluid chamber (18). The housing (12) can provide a fluid passage (39) for fluid communication between the expandable fluid chamber (18) and a source of pressurized fluid. The housing (12) can have a seat (25) in fluid communication with the aperture (15). An end (38) of the modular sleeve (14) can be seated with respect to a seat (25) of the housing (12) to seal the fluid passage (39).

13 Claims, 3 Drawing Sheets

(52) U.S. Cl.
CPC ............... *F16H 2007/0859* (2013.01); *F16H 2007/0878* (2013.01)

(58) Field of Classification Search
CPC ............ F16H 2007/0878; F16H 7/08; F16H 2007/0806; F16K 15/04; F16K 15/042; F16K 15/044
See application file for complete search history.

(56) References Cited

U.S. PATENT DOCUMENTS

| | | | |
|---|---|---|---|
| 6,322,468 B1 | 11/2001 | Wing et al. | |
| 6,361,458 B1 * | 3/2002 | Smith | F16H 7/0848 474/109 |
| 6,435,993 B1 | 8/2002 | Tada | |
| 7,189,175 B2 | 3/2007 | Maino et al. | |
| 8,562,465 B2 | 10/2013 | Mishima | |
| 2004/0266571 A1 | 12/2004 | Izutsu et al. | |
| 2007/0032323 A1 | 2/2007 | Yoshida | |
| 2007/0270259 A1 | 11/2007 | Koch | |
| 2008/0015609 A1 | 1/2008 | Kroon et al. | |
| 2008/0064546 A1 | 3/2008 | Ullein | |
| 2011/0183796 A1 | 7/2011 | Kurematsu et al. | |
| 2015/0024887 A1 * | 1/2015 | Oh | F16H 7/08 474/110 |
| 2015/0330482 A1 * | 11/2015 | Todd | F16H 7/0836 474/109 |
| 2016/0033016 A1 * | 2/2016 | Todd | F16H 7/0836 474/111 |

FOREIGN PATENT DOCUMENTS

| | | |
|---|---|---|
| CN | 101018961 A | 8/2007 |
| CN | 102076995 A | 5/2011 |
| CN | 102135162 A | 7/2011 |
| CN | 102141124 A | 8/2011 |
| FR | 2803005 A1 | 6/2001 |
| JP | 2000346152 A | 12/2000 |
| JP | 2001-021011 A | 1/2001 |
| JP | 2004176821 A | 6/2004 |
| JP | 2005042769 A | 2/2005 |
| JP | 2007040440 A | 2/2007 |

OTHER PUBLICATIONS

English language abstract for JP 2001-021011 extracted from espacenet.com database on Jul. 20, 2017, 2 pages.
English language abstract for CN 1782464 extracted from espacenet.com database on May 6, 2019, 2 pages.
English language abstract and machine-assisted English translation for CN 1928392 extracted from espacenet.com database on May 6, 2019, 7 pages.
English language abstract for CN 101018961 extracted from espacenet.com database on May 6, 2019, 1 page.
English language abstract for CN 102076995 extracted from espacenet.com database on May 6, 2019, 2 pages.
English language abstract and machine-assisted English translation for CN 102135162 extracted from espacenet.com database on May 6, 2019, 6 pages.
English language abstract for CN 102141124 extracted from espacenet.com database on May 6, 2019, 2 pages.
English language abstract and machine-assisted English translation for FR 2 803 005 extracted from espacenet.com database on May 6, 2019, 7 pages.
English language abstract and machine-assisted English translation for JP 2000-346152 extracted from espacenet.com database on Oct. 9, 2019, 5 pages.
English language abstract and machine-assisted English translation for JP 2004-176821 extracted from espacenet.com database on Oct. 9, 2019, 5 pages.
English language abstract and machine-assisted English translation for JP 2005-042769 extracted from espacenet.com database on Oct. 9, 2019, 7 pages.
English language abstract for JP 2007-040440 extracted from espacenet.com database on Oct. 9, 2019, 1 page.

* cited by examiner

WEIGHT AND COST OPTIMIZED CARRIER FOR MODULAR HYDRAULIC TENSIONER

CROSS-REFERENCE TO RELATED APPLICATIONS

This application is the National Stage of International Patent Application No. PCT/US2015/065515, filed on Dec. 14, 2017, which claims priority to and all the advantages of U.S. Provisional Patent Application No. 62/097,168, filed on Dec. 29, 2014, the content of which is incorporated herein by reference.

FIELD OF THE INVENTION

The invention relates to a hydraulic chain tensioner having a piston longitudinally moveable in a housing, and more particularly to the housing of the tensioner.

BACKGROUND

There is a desire to provide a cost-effective and lightweight housing for a hydraulic chain tensioner.

SUMMARY

A hydraulic tensioner for an endless loop power transmission member can include a housing, a piston moveable from a retracted position toward an extended position with respect to the housing in response to fluid pressure, and a tensioner spring biasing the piston toward the extended position with respect to the housing. The hydraulic tensioner can include a modular sleeve supported by the housing and defining an aperture for slidably receiving the piston. The piston and the aperture of the modular sleeve can define an expandable fluid chamber. The housing can support the modular sleeve and provide a fluid passage for fluid communication between the expandable fluid chamber and a source of pressurized fluid.

A hydraulic tensioner for an endless loop power transmission member can include a modular sleeve having an aperture extending along a longitudinal axis, a housing for supporting the modular sleeve, a tensioner spring mounted within the modular sleeve, and a slideable piston mounted within the modular sleeve to be moveable along the longitudinal axis of the aperture. The housing can have a seat in fluid communication with the aperture of the modular sleeve and defining a fluid passage allowing fluid communication with a source of pressurized fluid. An end of the modular sleeve can be seated with respect to the seat of the housing to seal the fluid passage in fluid communication with the expandable fluid chamber. The piston and the modular sleeve can define an expandable fluid chamber in fluid communication with the fluid passage. The piston can be moveable between an extended position and a retracted position with respect to the modular sleeve in response to fluid pressure within the expandable fluid chamber. The piston can be biased by the tensioner spring toward the extended position.

A hydraulic tensioner can be manufactured for attachment to an engine assembly. The hydraulic tensioner can include a piston operable for movement in response to fluid pressure within an expandable fluid chamber. The method can include forming a modular sleeve defining an aperture for slidably receiving the piston such that the piston and the aperture define the expandable fluid chamber, forming a housing to support the modular sleeve, and fixedly engaging the housing and the modular sleeve with respect to one another to allow sealed fluid communication between the expandable fluid chamber and a source of pressurized fluid.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
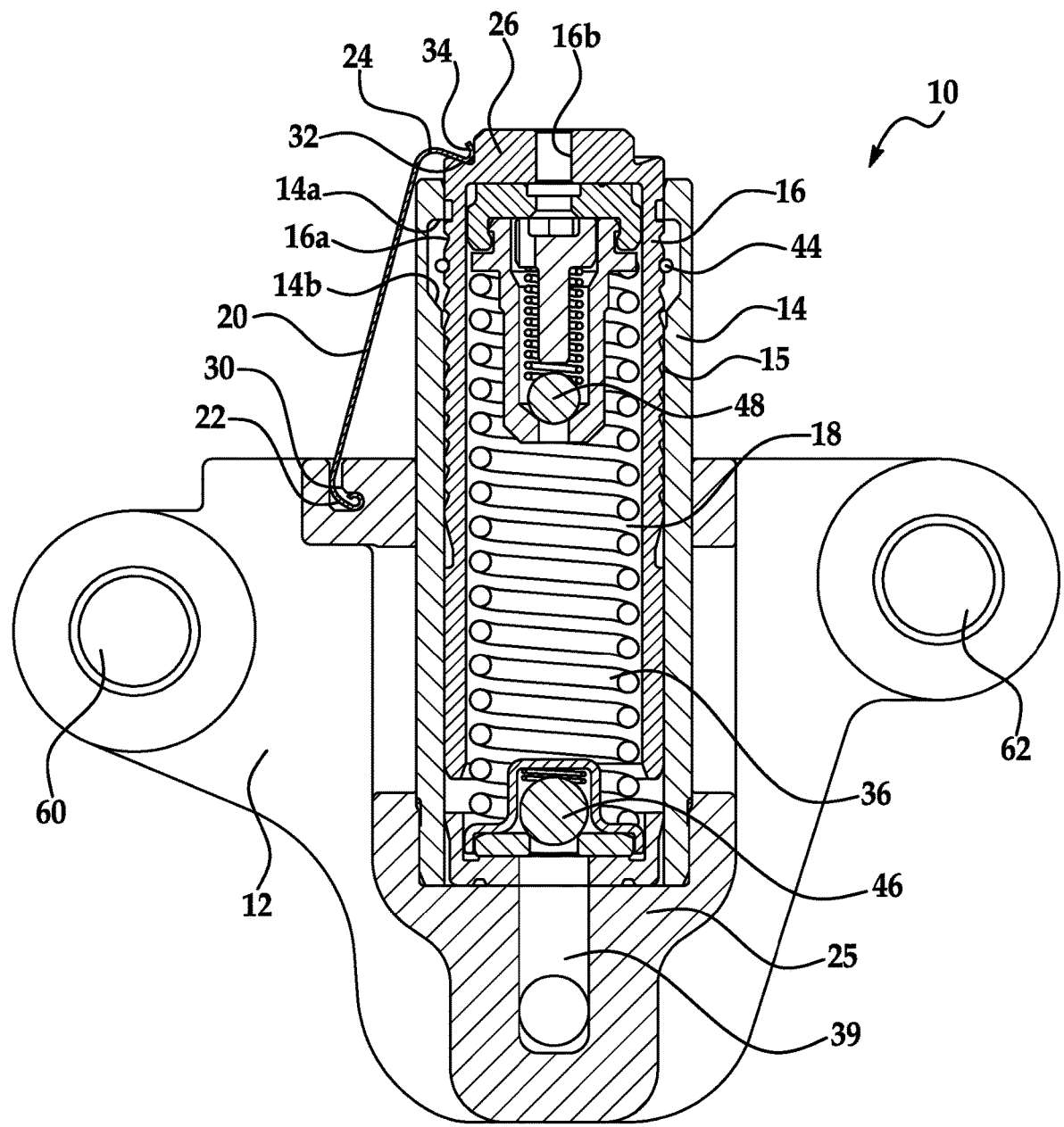
FIG. 1 is a cross sectional view of a hydraulic tensioner having a housing, a piston moveable from a retracted position toward an extended position with respect to the housing in response to fluid pressure, a tensioner spring biasing the piston toward the extended position, a modular sleeve supported by the housing and defining an aperture for slidably receiving the piston, and an expandable fluid chamber defined by the aperture and the piston, the housing providing a fluid passage for fluid communication between the expandable fluid chamber and a source of pressurized fluid, the piston being oscillatable by an endless loop power transmission member such that a snap ring carried on the piston engages with side walls of an annular groove formed within the modular sleeve to define longitudinal end limits of travel for the piston during oscillation, while allowing supplemental periodic incremental sequential extending movement of the piston outwardly toward the extended position simultaneously with snap ring movement into another adjacent groove of the piston in response to fluid pressure within the expandable fluid chamber.

Referring now to FIGS. 1-4, a tensioning system for imparting tension to an endless loop power transmission member can include a hydraulic tensioner 10. By way of example and not limitation, the endless loop power transmission member can include a chain or a belt encircling a driving sprocket and at least one driven sprocket. The hydraulic tensioner 10 can include a housing 12 supporting a hollow longitudinal sleeve 14 defining an interior aperture. The interior aperture can be a cylindrical aperture. A piston 16 can be slidably received within the cylindrical aperture within sleeve 14 for longitudinal movement between an extended position and a retracted position. A tensioner spring 36 can bias the piston 16 toward the extended position with respect to the cylindrical aperture 14. The piston 16 and the cylindrical aperture 14 can define an expandable fluid chamber 18. In operation, fluid enters the fluid chamber 18 through a fluid passage 39 formed in the housing 12 from a source of pressurized fluid, such as an oil pump or reservoir. The hydraulic tensioner 10 can include a cantilever spring 20 having a first end 22 attachable to the housing 12 and a second end 24 releasibly engageable with the piston 16 for retaining the piston 16 in the retracted position within the cylindrical aperture 14 of the hydraulic tensioner 10 against urgings of the biasing spring 36 during storage, shipment and installation. The second end 24 can be disengageable from the piston 16 to allow longitudinal movement of the piston 16 outwardly toward the extended position with respect to the cylindrical aperture 14 of the housing 12. The second end 24 of the cantilever spring 20 can be re-engaged with an outer end of the piston 16 for retaining the piston 16 within the cylindrical aperture of the housing during service situations, by way of example and not limitation, such as service situations requiring repair, replacement, or adjustment of the endless loop power transmission member.

Figure 2:
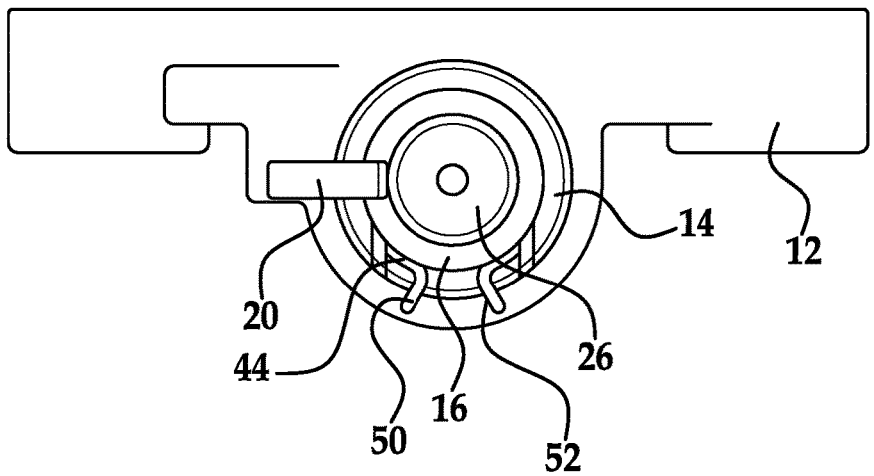
FIG. 2 is a top view of the hydraulic tensioner of FIG. 1.
Figure 3:
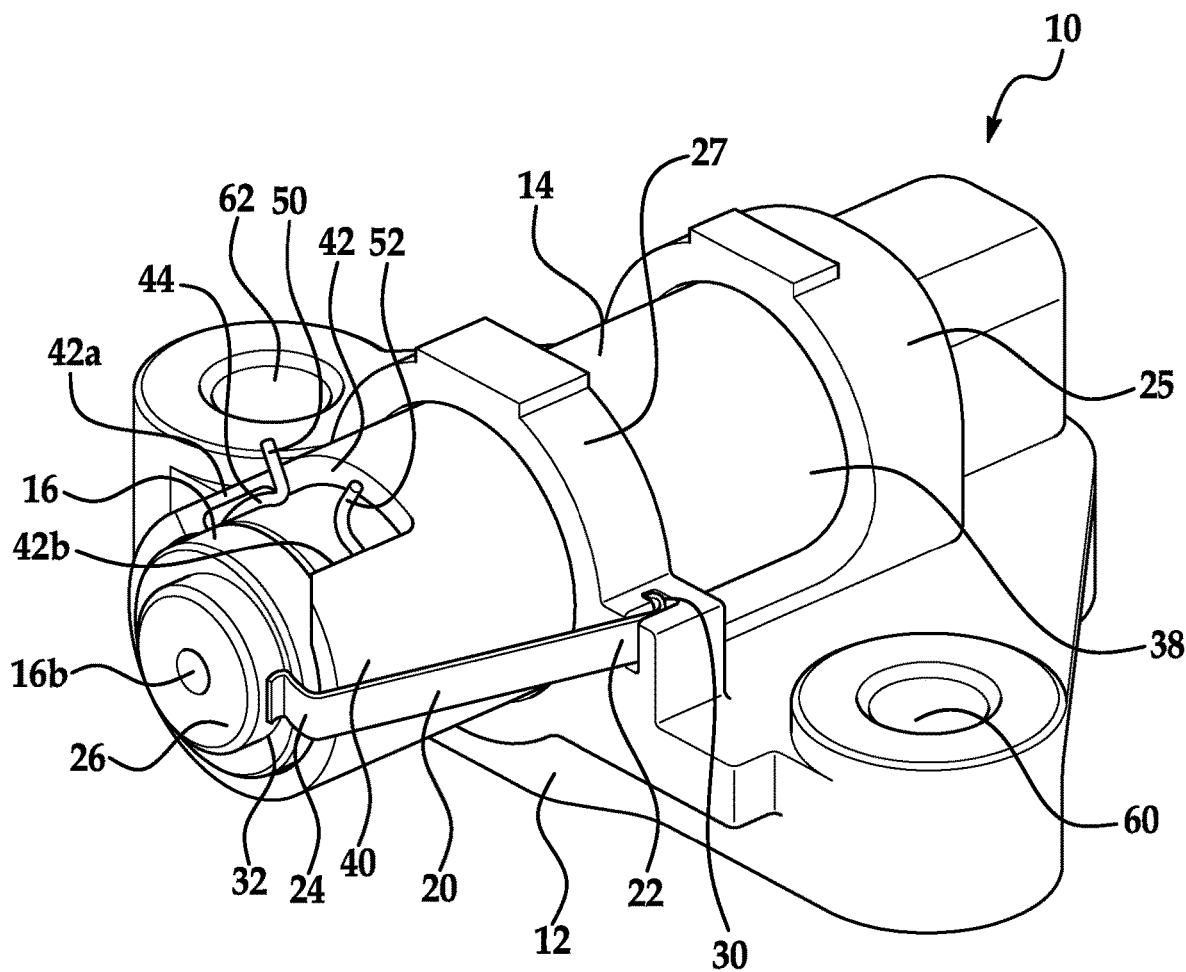
FIG. 3 is a perspective view of the hydraulic tensioner of FIG. 1 showing a seat machined in the housing engageable with the modular sleeve and a portion of the housing axially spaced from the seat and engageable with an outer periphery of the modular sleeve for retaining the modular sleeve, when the modular sleeve is seated with respect to the seat of the housing.

As best shown in FIGS. 1 and 3, by way of example and not limitation, the hydraulic tensioner 10 can include a spring-receiving slot 30 formed in the housing 12 of the hydraulic tensioner 10 for receiving the first end 22 of the cantilever spring 20. The cantilever spring 20 can be retained by the housing during both shipment and operation of the hydraulic tensioner 10, if desired. Alternatively, the cantilever spring 20 can be releasibly engaged and disengaged with respect to retaining notches at both ends for separation from the housing 12, if desired. The spring-receiving slot 30 can include a hook-shaped slot formed in the housing 12. The first end 22 of the cantilever spring 20 can include a shaped end complementary to the shape of the spring-receiving slot 30 such that the first end 22 can be fixedly secured within the spring-receiving slot 30. By way of example and not limitation, the spring-receiving slot 30 can be located on the housing 12 along a surface adjacent to an outwardly extending nose end 26 of the piston 16. The second end 24 of the cantilever spring 20 can move relative to the fixed first end 22. As best shown in FIGS. 1-3, a spring-retention groove 32 can be formed on the nose end 26 of the piston 16 for retention of the second end 24 of the cantilever spring 20. As best shown in FIGS. 1 and 3, the cantilever spring 20 can include a hooked end 34 at the second end 24 of the cantilever spring 20. The cantilever spring 20 can include a flat bar, wire, or cross-sectional spring material. The hooked end 34 can be engageable with the spring-retention groove 32 for securing the cantilever spring 20 to the nose end 26 of the piston 16. By way of example and not limitation, the cantilever spring 20 can engage the piston 16 via a pin-in-hole connection or other retention method. When the piston 16 is spring-loaded during shipment of the hydraulic tensioner 10, the piston 16 can be secured within the cylindrical aperture of the sleeve 14 by engagement of the cantilever spring 20 with the piston 16. It should be recognized by those skilled in the art that the first and/or second ends 22, 24 interfacing between the cantilever spring 20 and the piston 16, and/or the cantilever spring 20 and the housing 12, could be modified to allow the cantilever spring 20 to be symmetrical with respect to the first end 22 and second end 24.

Figure 4:
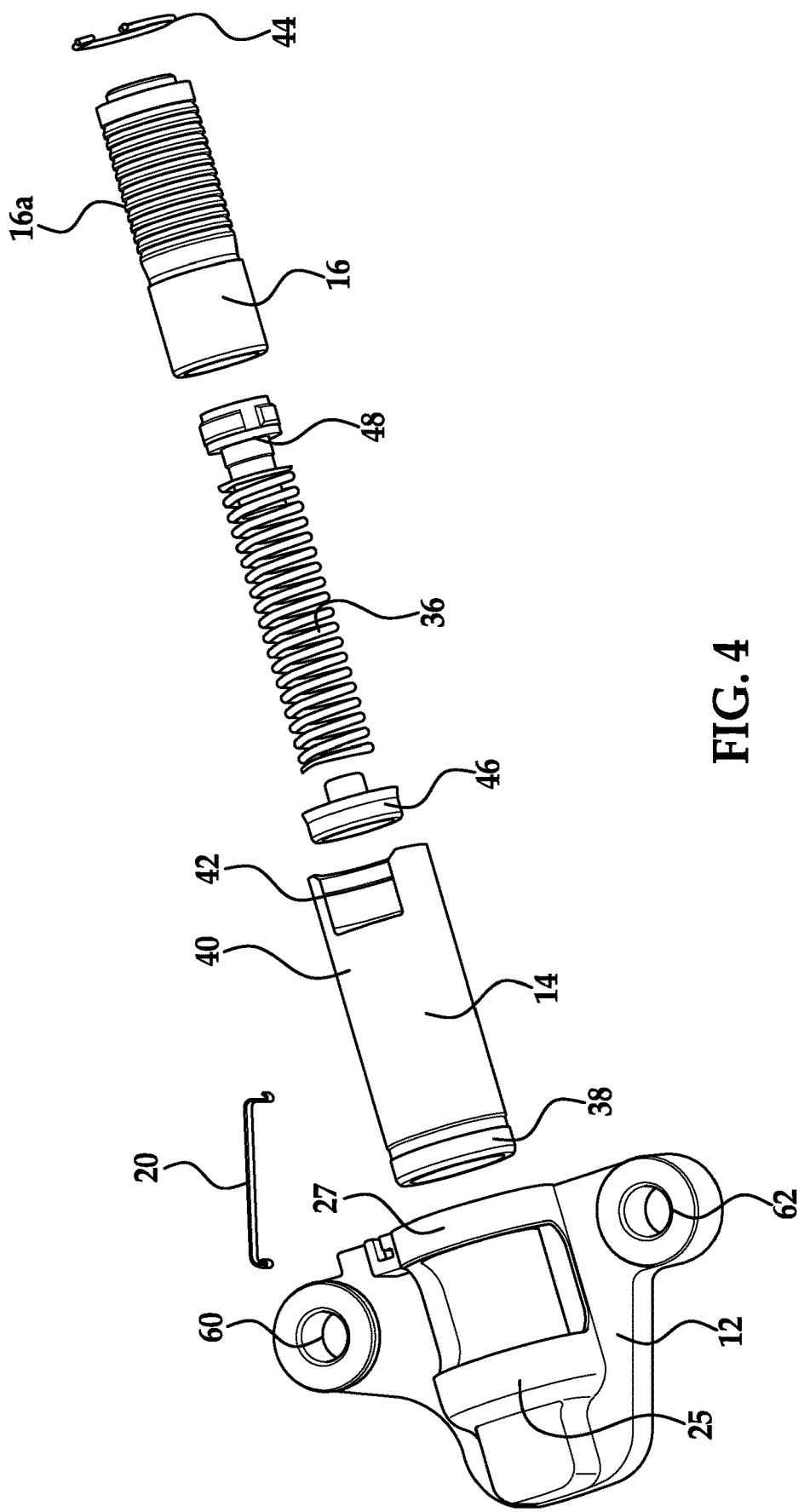
FIG. 4 is an exploded view of the hydraulic tensioner of FIG. 1 showing a snap ring selectively engageable within one of a plurality of grooves formed on the piston as the piston is driven toward the extended position, a window defined by the modular sleeve having spaced side walls allowing outer ends of the snap ring to expand slightly and the snap ring to move between adjacent grooves in response to hydraulic fluid pressure within the fluid chamber ratcheting the piston outwardly with respect to the aperture of the modular sleeve, the tensioner spring interposed between a first check valve and a second check valve within the modular sleeve, the first check valve preventing back flow of hydraulic fluid out of the expandable fluid chamber of the housing, and the second check valve allowing intermittent lubrication of the endless loop power transmission member in response to oscillation of the piston.

Referring now to FIGS. 3-4, a longitudinal modular sleeve 14 can be supported by the housing 12 of the hydraulic tensioner 10. The modular sleeve 14 can be secured to the housing 12. The modular sleeve 14 can include a first end 38 located inwardly with respect to the housing 12 and a second end 40 located outwardly with respect to the housing 12. The second end 40 can receive the piston 16 and allow for longitudinal movement of the piston 16 inwardly and outwardly within the cylindrical aperture defined by the sleeve 14 with respect to the housing 12. It should be recognized by those skilled in the art that the shape of the housing 12 supporting the modular sleeve 14 can be modified. The modular sleeve 14 can define a notch or window 42 located at the second end 40 with spaced side walls 42a, 42b. As best seen in FIGS. 1, 3 and 4, the hydraulic tensioner 10 can include a snap ring 44 fixed to an outer circumference of the piston 16 and selectively engageable within one of the plurality of grooves 16a in sequential order along the external surface of the piston 16 as the piston is driven toward the extended position. As best seen in FIG. 3, the snap ring 44 can have at least one projection 50, 52 extending radially outwardly with respect to the piston 16 and engageable within the window 42. The side walls 42a, 42b of the window 42 allow the outer ends 50, 52 of the snap ring 44 to expand slightly in response to hydraulic fluid pressure within the expandable fluid chamber 18 to ratchet the piston 16 outwardly in order to maintain a predetermined pressure on the endless loop power transmission member in response to gradual elongation and wear of the endless loop power transmission member. The outward piston 16 ratcheting corresponds to a reduced back pressure from the endless loop power transmission member on the piston 16 as the endless loop power transmission member gradually elongates and wears, thereby moving the snap ring 44 from one groove 16a to another groove 16a of the piston 16 as the piston 16 extends outwardly from the cylindrical aperture of the housing to maintain a desired predetermined pressure on the endless loop power transmission member. As best seen in FIG. 1, the modular sleeve 14 includes an inner annular groove having sidewalls 14a, 14b for receiving the snap ring 44 and for limiting longitudinal oscillation movement of the piston 16 within the cylindrical aperture of the housing 12 in response to oscillation of the endless loop power transmission member during rotation, while back pressure from the endless loop power transmission member is substantially balanced with fluid pressure within the expandable fluid chamber 18 of the hydraulic tensioner. The snap ring 44 interacts with the sidewalls 14a, 14b to define longitudinal end limits of oscillation of the piston while maintaining the desired predetermined pressure on the endless loop transmission member. Elongation of the endless loop power transmission member reduces back pressure from the endless loop power transmission member on the piston 16, and allows the hydraulic fluid pressure within the expandable fluid chamber 18 of the housing 12 to ratchet the piston 16 outwardly driving the snap ring 44 into another groove 16a of the piston 16 extending the piston 16 to an incrementally expanded outwardly extended position. The ratchet motion sequentially drives the piston 16 outwardly with respect to the housing 12 in order to maintain the desired predetermined pressure on the endless loop power transmission member as the endless loop power transmission member gradually elongates and wears during an expected lifetime of use.

As best shown in FIGS. 1 and 4, the hydraulic tensioner 10 can include at least one check valve 46, 48 received within the cylindrical aperture of the sleeve 14. The tensioner spring 36 can be interposed between a first check valve 46 and a second check valve 48 within the modular sleeve 14. The tensioner spring 36 can bias the piston 16 in an outward direction from the cylindrical aperture of the sleeve 14. The first check valve 46 prevents back flow of the hydraulic fluid out of the expandable chamber 18 of the housing 12, thereby preventing inward movement of the piston 16 beyond the degree allowed by the interaction of the snap ring 44 with the side wall 14b of the sleeve 14. The second check valve 48 allows intermittent lubrication of the endless loop power transmission member as the piston 16 is "pumped" between the extended and retracted positions during longitudinal movement of the snap ring 44 between the end limits of travel defined by the side walls 14a, 14b of the inner annular groove of the sleeve 14.

As best seen in FIGS. 3-4, the hydraulic tensioner 10 can include a seat 25 formed in the housing 12 engageable with the modular sleeve 14, at least one fluid passage 39 formed in the housing 12 allowing fluid communication between the source of pressurized fluid and the expandable fluid chamber 18, and a portion 27 of the housing 12 engageable with an outer periphery of the modular sleeve 14 for retaining the modular sleeve 14 when the modular sleeve 14 is seated with respect to the seat 25 of the housing 12. The portion 27 of the housing 12 can be separate and axially spaced apart with respect to the seat 25. The housing 12 can include a supplemental support for the modular sleeve 14 including at least one concentric ring of material 27 forming part of the housing 12 and located along the longitudinal axis of the modular sleeve 14. The aperture 15 of the modular sleeve 14 can include a first end 38 and a second end 40. The first end 38 can be seated with respect to the seat 25 of the housing 12 allowing sealed fluid communication between the expandable fluid chamber 18 and the source of pressurized fluid. The second end 40 can slidably receive the piston 16 and allow movement of the piston 16 in response to fluid pressure. By way of example and not limitation, the modular sleeve 14 and the housing 12 can be press-fit to provide a sealed fluid passage communication between the expandable fluid chamber 18 and the source of pressurized fluid. The housing 12 can be overmolded on the modular sleeve 14 to provide sealed fluid passage communication between the expandable fluid chamber 18 and the source of pressurized fluid. The modular sleeve 14 can be formed as a solid pin and the housing 12 can be overmolded on the pin and the pin can be formed to provide sealed fluid passage communication between the expandable fluid chamber 18 and the source of pressurized fluid. The housing 12 can include at least one bolt aperture 60, 62 and a fluid passage 39 allowing fluid communication between the expandable fluid chamber 18 and the source of pressurized fluid.

A hydraulic tensioner 10 can be manufactured for installation with respect to an engine assembly. The hydraulic tensioner 10 can include a piston 16 operable for movement in an expandable fluid chamber 18 in response to fluid pressure. The method can include forming a modular sleeve 14 defining an aperture 15 for slidably receiving the piston 16, such that the piston 16 and the aperture 15 define an expandable fluid chamber 18, forming a housing 12 to support the modular sleeve 14 and the piston 16, and fixedly engaging the housing 12 and the modular sleeve 14 with respect to one another to provide sealed fluid passage communication between the expandable fluid chamber 18 and a source of pressurized fluid. The method can further include machining the housing 12 sequentially to first define a portion of material 27 engageable with an outer periphery of the modular sleeve 14 for retaining the modular sleeve 14 when the modular sleeve 14 is seated with respect to the seat 25 of the housing 12, and to second define a separate, longitudinally spaced, sleeve-engaging seat 25. The method can further include forming at least one fluid passage 39 in fluid communication between the source of pressurized fluid and the expandable fluid chamber 18 through the sleeve-engaging seat 25 of the housing 12. The fixedly engaging step of the method can further include press-fitting the modular sleeve 14 and the housing 12 to one another to provide a sealed fluid passage 39 defined in the housing 12 in fluid communication between the source of pressurized fluid and the expandable fluid chamber 18. The fixedly engaging step of the method can further include overmolding the housing 12 on the modular sleeve 14, machining the housing 12 to define at least one fluid passage 39 in fluid communication between the source of pressurized fluid and the expandable fluid chamber 18, and machining the housing 12 to define at least one bolt aperture 60, 62 for attaching the hydraulic tensioner 10 to an engine block. The modular sleeve 14 can allow machining the housing 12 to define a housing 12 of optimal weight and reduce manufacturing costs. By way of example and not limitation, the housing 12 can be formed of plastic or aluminum.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hydraulic tensioner (10) for an endless loop power transmission member, the hydraulic tensioner (10) including a housing (12), a piston (16) moveable from a retracted position toward an extended position with respect to the housing (12) in response to fluid pressure, and a tensioner spring (36) biasing the piston (16) toward the extended position with respect to the housing (12), wherein the hydraulic tensioner (10) comprises:
   a hollow modular sleeve (14) supported by the housing (12), the modular sleeve (14) defining an aperture (15) for slidably receiving the piston (16), the piston (16) and the aperture (15) of the modular sleeve (14) defining an expandable fluid chamber (18);
   the housing (12) supporting the modular sleeve (14) and providing at least one fluid passage (39) for fluid communication between the expandable fluid chamber (18) and a source of pressurized fluid, wherein the aperture (15) of the modular sleeve (14) has a first open end (38) and second open end (40);
   a seat (25) formed in the housing (12) engageable with the modular sleeve (14); the at least one fluid passage (39) formed in the housing (12) allowing fluid communication between the source of pressurized fluid and the expandable fluid chamber (18); and
   a portion (27) of the housing (12) engageable with an outer periphery of the modular sleeve (14) for retaining the modular sleeve (14) when the modular sleeve (14) is seated with respect to the seat (25) of the housing (12), the portion (27) of the housing (12) separate and axially spaced apart with respect to the seat (25),
   wherein the portion (27) is at least one concentric ring of material forming part of the housing (12) and located along the longitudinal axis of the modular sleeve (14), and
   wherein the modular sleeve (14) is exposed between the portion (27) and the seat (25).

2. The hydraulic tensioner (10) of claim 1, wherein the first open end (38) is seated with respect to the seat (25) of the housing (12) allowing sealed fluid passage communication between the expandable fluid chamber (18) and the source of pressurized fluid, the second open end (40) is for slidably receiving the piston (16) and allowing movement of the piston (16) in response to fluid pressure.

3. The hydraulic tensioner (10) of claim 1 further comprising:
a plurality of grooves (16a) formed on an external surface of the piston (16);
a snap ring (44) selectively engageable within one of the plurality of grooves (16a) in sequential order along the external surface of the piston (16) as the piston is driven toward the extended position, the snap ring (44) having outer ends (50, 52) extending radially outwardly with respect to the piston (16); and
a window (42) defined by the modular sleeve (14) having spaced side walls (42a, 42b), the side walls (42a, 42b) of the window (42) allowing the outer ends (50, 52) of the snap ring (44) to expand slightly and the snap ring (44) to move between adjacent grooves of the plurality of grooves (16a) in response to hydraulic fluid pressure within the expandable fluid chamber (18) ratcheting the piston (16) outwardly with respect to the aperture (15) of the modular sleeve (14).

4. The hydraulic tensioner (10) of claim 3 further comprising:
the tensioner spring (36) interposed between a first check valve (46) and a second check valve (48) within the modular sleeve (14), the first check valve (46) preventing back flow of hydraulic fluid out of the expandable fluid chamber (18) of the housing (12), the second check valve (48) allowing intermittent lubrication of the endless loop power transmission member as the piston (16) is driven in oscillation between allowable extended and retracted positions during movement of the snap ring (44) interacting with end limits of travel defined by side walls (14a, 14b) of an inner annular groove of the modular sleeve (14).

5. The hydraulic tensioner (10) of claim 4, wherein the first open end (38) is adjacent the inner annular groove of the modular sleeve (14).

6. The hydraulic tensioner (10) of claim 1, wherein the modular sleeve (14) and the housing (12) are press-fit to provide sealed fluid passage communication between the expandable fluid chamber (18) and the source of pressurized fluid.

7. The hydraulic tensioner (10) of claim 1, wherein the housing (12) is overmolded on the modular sleeve (14) to provide sealed fluid passage communication between the expandable fluid chamber (18) and the source of pressurized fluid.

8. The hydraulic tensioner (10) of claim 1, wherein the modular sleeve (14) is formed as a solid pin, the housing (12) overmolded on the pin, the pin formed to provide sealed fluid passage communication between the expandable fluid chamber (18) and the source of pressurized fluid, the housing (12) having at least one bolt aperture (60, 62) and the at least one fluid passage (39) allowing fluid communication between the expandable fluid chamber (18) and the source of pressurized fluid.

9. A hydraulic tensioner (10) for an endless loop power transmission member comprising:
a hollow modular sleeve (14) having an aperture (15) extending along a longitudinal axis;
a housing (12) for supporting the modular sleeve (14), the housing (12) having a seat (25) in fluid communication with the aperture (15) of the modular sleeve (14) and defining a fluid passage (39) allowing fluid communication with a source of pressurized fluid, an end of the modular sleeve (14) seated with respect to the seat (25) of the housing (12) to seal the fluid passage (39);
a tensioner spring (36) mounted within the modular sleeve (14); and a slideable piston (16) mounted within the modular sleeve (14) to be moveable along the longitudinal axis in the aperture (15), the piston (16) and the modular sleeve (14) defining an expandable fluid chamber (18) in fluid communication with the fluid passage (39), the piston (16) moveable between an extended position and a retracted position with respect to the modular sleeve (14) in response to fluid pressure within the fluid chamber (18), the piston (16) biased by the tensioner spring (36) toward the extended position, wherein the aperture (15) of the modular sleeve (14) has a first open end (38) and second open end (40),
a seat (25) formed in the housing (12) engageable with the modular sleeve (14); the at least one fluid passage (39) formed in the housing (12) allowing fluid communication between the source of pressurized fluid and the expandable fluid chamber (18); and
a portion (27) of the housing (12) engageable with an outer periphery of the modular sleeve (14) for retaining the modular sleeve (14) when the modular sleeve (14) is seated with respect to the seat (25) of the housing (12), the portion (27) of the housing (12) separate and axially spaced apart with respect to the seat (25),
wherein the portion (27) is at least one concentric ring of material forming part of the housing (12) and located along the longitudinal axis of the modular sleeve (14), and
wherein the modular sleeve (14) is exposed between the portion (27) and the seat (25).

10. The hydraulic tensioner (10) of claim 9, wherein the modular sleeve (14) and the housing (12) are press-fit to provide sealed fluid passage communication between the expandable fluid chamber (18) and the source of pressurized fluid.

11. A method of manufacturing for a hydraulic tensioner (10) having a piston (16) operable for movement in an expandable fluid chamber (18) in response to fluid pressure, the method comprising:
forming a hollow modular sleeve (14) defining an aperture for slidably receiving the piston (16), the piston (16) and the aperture defining the expandable fluid chamber (18), wherein the aperture (15) of the modular sleeve (14) has a first open end (38) and second open end (40);
forming a housing (12) to support the modular sleeve (14);
fixedly engaging the housing (12) and the modular sleeve (14) with respect to one another to provide sealed fluid passage communication between the expandable fluid chamber (18) and a source of pressurized fluid;
machining the housing (12) sequentially to first define a portion of material (27) engageable with an outer periphery of the modular sleeve (14) for retaining the modular sleeve (14) when the modular sleeve (14) is seated with respect to the seat of the housing (12), and to second define a separate, longitudinally spaced, sleeve-engaging seat (25); and
forming at least one fluid passage (39) in fluid communication between the source of pressurized fluid and the expandable fluid chamber (18) through the sleeve-engaging seat (25) of the housing (12), wherein the portion of material (27) is at least one concentric ring of material forming part of the housing (12) and locatable along the longitudinal axis of the modular sleeve (14), and wherein the modular sleeve (14) is exposable between the portion (27) and the seat (25).

12. The method of claim 11, wherein the fixedly engaging further comprises:

press-fitting the modular sleeve (14) and the housing (12) to provide a sealed fluid passage defined in the housing (12) in fluid communication between the source of pressurized fluid and the expandable fluid chamber (18).

13. The method of claim 11, wherein the fixedly engaging further comprises:

overmolding the housing (12) on the modular sleeve (14);

machining the housing (12) to define at least one fluid passage (39) in fluid communication between the source of pressurized fluid and the expandable fluid chamber (18); and machining the housing (12) to define at least one bolt aperture (60, 62) for attaching the hydraulic tensioner (10) to an engine block.

\* \* \* \* \*